United States Patent
Lenhert et al.

(10) Patent No.: US 10,184,568 B2
(45) Date of Patent: Jan. 22, 2019

(54) BI-DIRECTIONAL ROTARY VALVE

(71) Applicant: Saint-Gobain Performance Plastics Corporation, Solon, OH (US)

(72) Inventors: Jon M. Lenhert, Brea, CA (US); Aaron V. Gordon, Anaheim, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 344 days.

(21) Appl. No.: 14/498,892

(22) Filed: Sep. 26, 2014

(65) Prior Publication Data

US 2015/0083955 A1  Mar. 26, 2015

Related U.S. Application Data

(60) Provisional application No. 61/883,113, filed on Sep. 26, 2013.

(51) Int. Cl.
*F16K 1/226* (2006.01)

(52) U.S. Cl.
CPC .................. *F16K 1/2263* (2013.01)

(58) Field of Classification Search
CPC ....... F16K 1/2263; F16K 1/226; F16K 1/2071
USPC ................ 251/305–308, 192, 173–174, 368; 277/644
See application file for complete search history.

(56) References Cited

U.S. PATENT DOCUMENTS

| | | | |
|---|---|---|---|
| 3,642,248 A * | 2/1972 | Benware | F16K 1/2266 251/172 |
| 3,650,508 A * | 3/1972 | Kosmala | F16K 1/2263 251/173 |
| 4,005,848 A | 2/1977 | Eggleston | |
| 4,113,268 A * | 9/1978 | Simmons | F16K 1/2266 251/173 |
| 4,162,782 A | 7/1979 | Wilkins | |
| 4,176,820 A * | 12/1979 | Broadway | F16K 1/2263 251/173 |
| 4,195,815 A | 4/1980 | Stager | |
| 4,244,387 A * | 1/1981 | Snape | F16K 1/2263 251/173 |
| 4,271,858 A * | 6/1981 | Snape | F16K 1/2263 251/306 |

(Continued)

FOREIGN PATENT DOCUMENTS

WO  2015048548 A1  4/2015

OTHER PUBLICATIONS

International Search Report for PCT/US2014/057862 dated Jan. 8, 2015, 1 page.

*Primary Examiner* — John Bastianelli

(74) *Attorney, Agent, or Firm* — Abel Law Group, LLP; Chi Suk Kim

(57) ABSTRACT

A bi-directional cryogenic rotary valve having a housing defining a fluid passageway, a control member rotatably disposed within the fluid passageway, and a seal assembly positioned along an inner surface of the housing to provide a bubble tight seal between the housing and the control member. The rotary valve adapted to operate at or near cryogenic temperatures (i.e., at −160° C.) while maintaining an effective seal in both the forward and reverse directions. The rotary valve being capable of retrofitting against wear and operational stress sustained from repeated use and operation.

17 Claims, 3 Drawing Sheets

(56) References Cited

U.S. PATENT DOCUMENTS

| | | | | |
|---|---|---|---|---|
| 4,289,296 | A | * | 9/1981 | Krause ............... F16K 1/2263 251/173 |
| 4,306,706 | A | * | 12/1981 | Olansen ............. F16K 1/2263 251/306 |
| 4,394,003 | A | | 7/1983 | Whitaker |
| 4,513,765 | A | * | 4/1985 | Rishovd .............. F16K 1/2263 251/306 |
| 4,582,080 | A | | 4/1986 | Stock |
| 4,593,916 | A | * | 6/1986 | Laulhe ................ F16K 1/226 251/306 |
| 2002/0130292 | A1 | * | 9/2002 | Nolan ................. F16J 15/062 251/315.1 |

* cited by examiner

BI-DIRECTIONAL ROTARY VALVE

CROSS-REFERENCE TO RELATED APPLICATION(S)

This application claims priority under 35 U.S.C. § 119(e) to U.S. patent application Ser. No. 61/883,113 entitled "Bi-Directional Rotary Valve," by John M. Lenhert and Aaron V. Gordon, filed Sep. 26, 2013, which is assigned to the current assignee hereof and incorporated herein by reference in its entirety

FIELD OF THE DISCLOSURE

The present disclosure relates to bi-directional rotary valves, and more particularly to rotary valves adapted to operate at cryogenic temperatures with enhanced fluidic sealing capability.

RELATED ART

There are several known types of valves for controlling and regulating the flow of a fluid within a fluid passageway. One particular valve utilizes a rotatable disc member disposed within the fluid passageway. One example of such a valve is a butterfly valve.

Generally, butterfly valves are quarter-turn valves. An internal control member can be operatively positioned within the fluid passageway perpendicular to the flow of a fluid. In this regard, the valve can be in the closed position. The control member can be rotated one quarter of a turn to be parallel to the flow of fluid such that the valve is in the fully open position. Moreover, intermediate rotations (i.e., rotations of between 0° and 90° can allow for the regulated flow or choke of fluid through the fluid passageway.

As is generally known, valves typically contain at least one sealing element. In the case of butterfly valves, a seal can be located between the valve body and the rotatable control member such that when in the closed position, the valve prevents fluid flow. The sealing characteristic of the sealing element can greatly affect performance of the valve. Many applications of valves require a bubble tight seal which substantially eliminates any unwanted passage of fluid through the valve.

Typical valve seals are constructed from plastic materials such as polytetrafluoroethylene (PTFE) or some other similar material and are subject to failure and a diminished sealing characteristic over extended use. Sealing elements constructed from these materials require frequent replacement from wear and reduced operative surface contact between the valve body and the rotatable disc member. In many applications the fluid being transported and handled by the valve can include contaminants such as sand, dirt, and other granular particles which can become lodged between the seal and the rotatable control member, causing scratching of the sealing and control member surfaces, deteriorating sealing performance and eventually rendering the seal inoperable.

Moreover, at extremely cold temperatures, such as those encountered in cryogenic valve operation (e.g., −160° C. and below) when handling liquid natural gas (LNG) or any other cryogenic fluid, the deterioration of the seal materials can be further compounded by expansion, cracking, and diminished surface contact resulting from mechanical changes (e.g., expansion and contraction) caused by temperature changes. An additional problem encountered in butterfly valves, and particularly in bi-directional butterfly valves, is the maintenance of a desired sealing characteristic in both the forward and reverse directions. This problem is further compounded by the use of the valves at or near cryogenic temperatures, where changing mechanical properties of the materials can decrease the sealing characteristic of the valve. Thus, a need exists for a bi-directional rotary valve capable of operating at extremely cold temperatures while maintaining a desired sealing characteristic in both the forward and reverse directions.

BRIEF DESCRIPTION OF THE DRAWINGS

Embodiments are illustrated by way of example and are not limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "bubble tight seal" refers to a valve assembly adapted to have a fluid leakage rate of 0 mL/min when in the closed position as defined by the Butterfly Valve (BFV) test described herein. Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid sealing arts.

Certain embodiments of the present disclosure relate to bi-directional valves which can operate at or near cryogenic temperatures (e.g., below −160° C.), provide enhanced sealing characteristics in both the forward and backward directions, and more efficiently adjust to wear and surface deterioration over extended lifetime use. In such a manner, embodiments of the valve can provide a bubble tight seal while automatically retrofitting for wear and surface deterioration caused during normal use.

Figure 1:
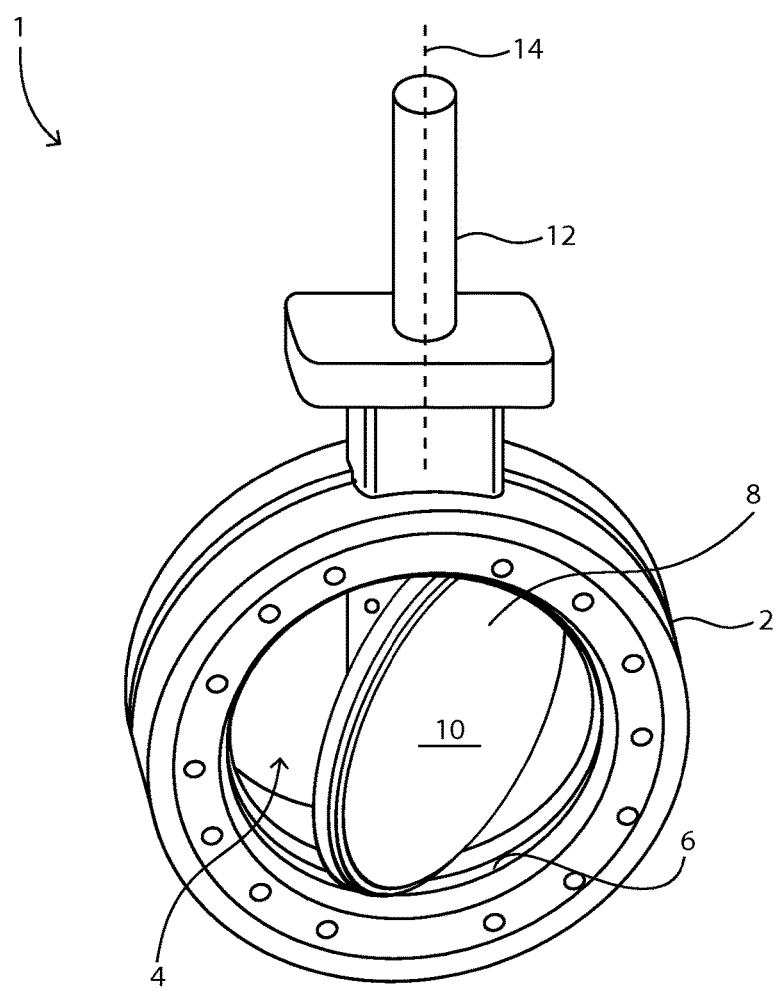
FIG. 1 includes a perspective view of a bi-directional rotary valve in accordance with an embodiment.

Referring now to FIG. 1, an embodiment of a bi-directional valve 1 can generally include a housing 2, a fluid passageway 4 defined by an inner surface 6 of the housing 2, and a control member 8 disposed within the housing 2 and contained within the fluid passageway 4. The control member 8 can have a generally circular face 10 that can completely block passage of a fluid through the fluid passageway 4 when in the closed position.

The valve 1 can further include an actuating member 12 coupled with the control member 8. The actuating member 12 can extend through the housing 2 and permit rotatable control of the control member 8 from a position external to the housing 2. The actuating member 12 can extend from the housing 2 along an axis of rotation 14 and can be operatively coupled to an actuator (not shown), such as a motor, a crank, a pneumatic cylinder, or any other actuating device known in the art.

Figure 2:
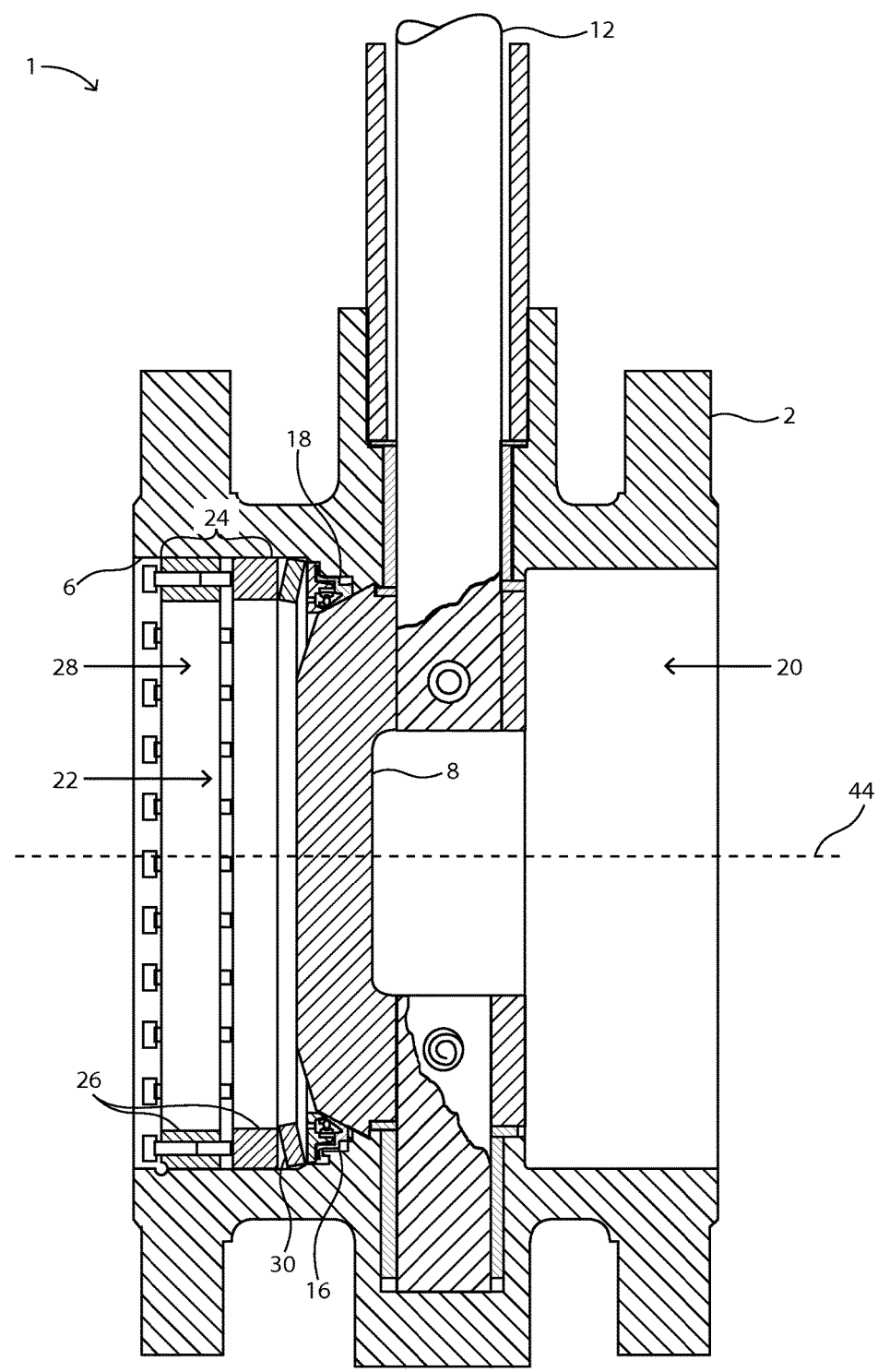
FIG. 2 includes a cross-sectional side view of a bi-directional rotary valve in accordance with an embodiment.

Referring now to FIG. 2, the valve 1 can further include a seal assembly 16 positioned along the inner surface 6 of the housing 2. The seal assembly 16 can be positioned within a radial recess 18 of the inner surface 6 and can circumscribe the fluid passageway 4. The seal assembly 16 can extend radially inward from the inner surface 6 and can compress upon engagement with the control member 8. As will be discussed in more detail below, the seal assembly 16 can provide enhanced sealing characteristics between the control member 8 and the inner surface 6 of the housing 2. In this regard, the valve 1 can be adapted to provide a bubble tight seal devoid of any perceptible fluid leakage.

The valve 1 can impede, regulate, or control the flow of fluid in two directions—a forward flow direction 20 and a reverse flow direction 22. Thus, the valve 1 is bi-directional as it can affect sealing in either direction 20, 22. For example, referring to FIG. 2, the valve 1 of FIG. 1 is shown in the closed position. In this regard, the control member 8 is engaged with the seal assembly 16 to form a bubble tight seal within the fluid passageway 4. In this regard, passage of fluid through the valve 1 is impeded by the combination of the housing 2, control member 8, and seal assembly 16.

To form a bubble tight seal, the seal assembly 16 can be secured within the housing 2 by a retention assembly 24. The retention assembly 24 can generally include one or more loading members 26, each having a central aperture 28 in fluidic communication with the fluid passageway 4. Each loading member 26 can be positioned within the fluid passageway 4 perpendicular to the direction of fluid flow. In this regard, the fluid passageway 4 can at least in part be defined by the apertures 28 of the loading members 26. In certain embodiments, a spring 30 can be positioned between the seal assembly 16 and the loading member 26 closest to the seal assembly 16.

In particular embodiments, the spring 30 can be selected from one of a standard compression spring, a conical compression spring, a coil spring, a gas spring, an air spring, a disc spring (e.g., a Belleville washer), a wave spring, or any combination thereof. Upon engaging the loading members 26 against the spring 30, the seal assembly 16 can be securely locked in place, devoid of any perceptible physical movement or play. In such a manner, the housing 2 and seal assembly 16 can be connected to allow easy access and replacement of the seal assembly 16, while simultaneously permitting operation of the valve 1 with a substantially or fully bubble tight seal. In alternative embodiments, the valve 1 can be formed without use of loading members 24 and the spring 30.

Figure 3:
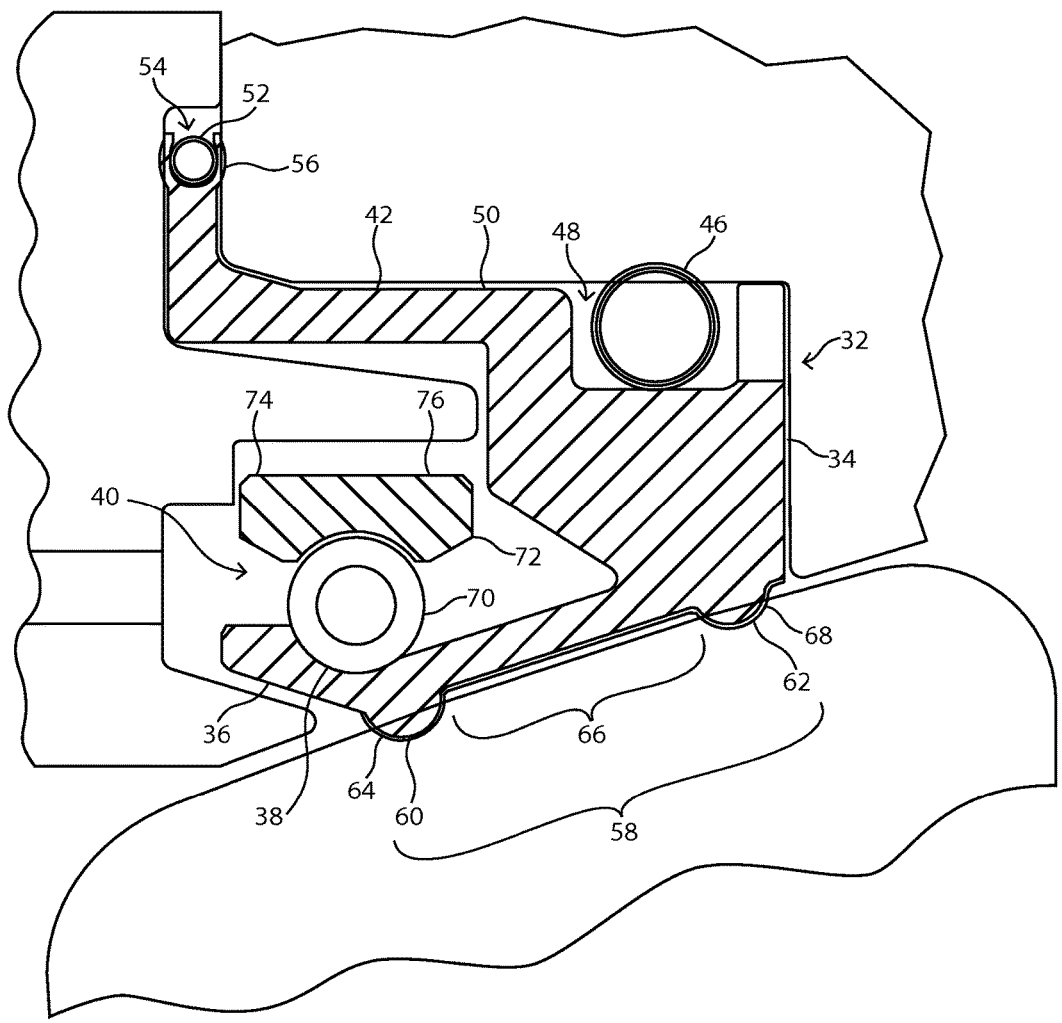
FIG. 3 includes a cross-sectional side view of a seal assembly for a bi-directional rotary valve in accordance with an embodiment.

FIG. 3 illustrates a seal assembly 16 operatively engaged with a control member 8. A seal assembly 16 in accordance with the description herein can be used in any rotary valve containing a control member 8. Generally, the seal assembly 16 can comprise an annular body 32, an intermediary member 70, and an annular member 72. The annular member 72 can be disposed radially around at least a portion of the annular body 32. In an embodiment, the intermediary member 70 can be positioned between the annular body 32 and the annular member 72. In another embodiment, the annular member 72 can be positioned directly around a portion of the annular body 32 without the intermediary member 70 disposed therebetween.

The annular body 32 can generally include a hub 34, a first arm 36 extending from the hub 34, and a second arm 42 extending from the hub 34. In particular embodiments, the first arm 36, the second arm 42, and the hub 34 can be substantially coaxial with a shared central axis at a center point 44 of the fluid passageway 4 (FIG. 2). In a particular embodiment, the annular body 32 can have a generally U-shaped cross-sectional profile as defined by the first arm 36, the hub 34, and the second arm 42.

The first and second arms 36 and 42 can extend outward from the hub 34. In an embodiment, the first and second arms 36 and 42 can be generally parallel. In another embodiment, the first and second arms 36 and 42 can extend outward from the hub 34 having a relative angle therebetween. The relative angle between the first and second arms 36 and 42 can be determined by the shape of the housing 2 and the shape of the control member 8. Specifically, as the angle of the sealing surface of the control member 8 increases (e.g., as the sealing surface moves away from a normal orientation relative to the circular face) the relative angle between the first and second arms 36 and 42 can increase to allow for a tighter seal and a corresponding enhanced sealing characteristic. In this regard, the present seal assembly 16 can be adapted to operatively fit within and seal a valve having any relative shape or size.

In a particular embodiment, the annular body 32 can include a spring 46 positioned along an outer surface 50 thereof. The annular body 32 can have a recess 48 extending radially inward from the outer surface 50. In a particular embodiment, the spring 46 can be disposed in the recess 48.

To increase the sealing characteristic, the spring 46 can have an internal diameter greater than the depth of the recess 48 so as to extend radially outward therefrom after insertion therein. In this regard, the spring 46 can compress against the inner wall of the housing 2 and form an enhanced fluidic seal between the housing 2 and the annular body 32. Moreover, this can enhance radial loading between the annular body 32 and the control member 8. In an embodiment, the spring 46 can distort from a generally circular shape to a more oblong configuration as compressed between the housing 2 and the control member 8.

In further embodiments, the annular body 32 can further include a second spring 52. The second spring 52 can be positioned within a distal cavity 54 of the second arm 42. In an embodiment, the second spring 52 can press opposing outer walls 56 of the distal cavity 54 against the surface of the housing 2. The spring 46 is shown exaggerated into the outer surface 50 and the outer walls 56 are shown exaggerated as they would appear prior to being compressively engaged by the neighboring components and surfaces.

The annular body 32 can contact the control member 8 along a sealing surface 58. The sealing surface 58 can include a combination of the hub 34 and the first arm 36. The sealing surface 58 can have a plurality of lobes 60. The lobes 60 can extend around the sealing surface 58 of the seal assembly 16 and can be coaxial with the center point 44 of the fluid passageway 4. The lobes 60 can be parallel or can intersect as desired. In particular embodiments, a first lobe 62 can be positioned substantially on the hub 34 and a second lobe 64 can be positioned on the first arm 36. In a particular embodiment, the lobes 60 can circumscribe the fluid passageway 4 in parallel so as to form two discrete contact areas with the control member 8. The lobes 60 can have a generally U-shaped cross-sectional profile and can have the same cross-sectional size. Alternatively, the lobes 60 can each have a different cross-sectional shape (e.g., triangular, circular, oblong, square, etc.). The lobes 60 can be monolithically formed from the same structure as the sealing surface 58 or they can be bonded (e.g., vulcanized) to the sealing surface 58 after formation thereof.

In an embodiment, a gap 66 can be located between adjacent lobes 60. The gap 66 may have any relative width as compared to the lobes, such as, for example, the gap can have a width, $W_G$, and the lobes 60 can have a width, $W_L$. In an embodiment, $W_G$ can be within a range between and including 0.1 and 10.0 $W_L$, such as $W_G$ can be within a range between and including 1.0 and 20.0 $W_L$, or even $W_G$ can be in range between and including 0.05 and 5.0 $W_L$. Moreover, $W_G$ can be within a range of between and including any of the values described above. The lobes 60 can extend from the sealing surface 58 a discrete distance, $D_L$. In an embodiment, $D_L$ can be the same for each of the lobes 60. In another embodiment, $D_L$ can be different for each of the lobes 60. It should be understood that the shape, size, and orientation of the lobes 60 and gap 66 can be of any combination or scale. Moreover, the shape, size, and orientation of the lobes 60 can be largely dependent on the precise nature of the valve's geometry and the intended scope of operability (i.e., temperature, type of fluid, contamination level of fluid, etc.). It may be desirable for $D_L$ to be lower in operations where granular materials may pass through the valve, so as to reduce surface exposure of the lobes 60. Moreover, it may be desirable to have three or more lobes in valves including control members with a low angled sealing surface to facilitate sufficient radial contact and compressive force. The lobes 60 are shown exaggerated into the control member 8 in the undeformed state as they would appear prior to closing the control member 8 to block fluid flow within the fluid passageway 4.

In particular embodiments, the sealing surface 58 can further include a polymeric layer 68. The polymeric layer 68 can comprise materials including, for example, a polymer, such as a polyketone, polyaramid, a polyimide, a polyetherimide, a polypheylene sulfide, a polyetherslfone, a polysulfone, a polypheylene sulfone, a polyamideimide, ultra high molecular weight polyethylene, a fluoropolymer, a polyamide, a polybenzimidazole, or any combination thereof.

An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments.

In yet other embodiments, the sealing surface 58 can comprise a low temperature hard coating, such as, for example, a diamond-like coating (DLC) impregnated therein. In particular embodiments, the DLC can have a lattice structure similar to a diamond, wherein each carbon atom comprises four carbon atoms equally spaced. Alternatively, the sealing surface 58 can comprise a material impregnated therein by use of a high velocity oxygen fuel (HVOF) coating. HVOF coatings can extend valve life by significantly increasing the seal assembly's resistance to wear and corrosion. Moreover, HVOF coatings can affect a smoother surface finish with bond strengths in excess of 10,000 pounds per square inch.

In addition to the sealing surface 58, the lobes 60 can further include lubrication to enhance sliding characteristics against the control member 8. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

To maintain the first arm 36 in contact with the control member 8, particularly during reverse flow of fluid through the valve 1, the seal assembly 16 can further include an intermediary member 70 positioned radially adjacent to the first arm 36. In particular embodiments, the intermediary member 70 can comprise a material having a modulus of elasticity of no less than 1 GPa, such as no less than 10 GPa, no less than 50 GPa, no less than 100 GPa, no less than 150 GPa, no less than 200 GPa, or even no less than 225 GPa. Similarly, the intermediary member 70 can have a modulus of elasticity of no greater than 700 GPa, such as no greater than 600 GPa, no greater than 500 GPa, no greater than 400 GPa, or even no greater than 300 GPa. Additionally the modulus of elasticity for the intermediary member 70 can be in a range of between and including any of the values described above, such as, for example, between 5 GPa and 15 GPa.

In operation, the intermediary member 70 can provide the annular body 32 with a radial inward force of no less than 0.5 $N/cm^2$, such as no less than 1.0 $N/cm^2$, no less than 2.0 $N/cm^2$, no less than 3.0 $N/cm^2$, or even no less than 4.0 $N/cm^2$. The intermediary member 70 can provide the annular body 32 with a radial inward force of no greater than 20 $N/cm^2$, no greater than 15 $N/cm^2$, no greater than 10 $N/cm^2$, no greater than 5 $N/cm^2$. In this regard, the intermediary member can radially support the annular body 32 while maintaining sufficient rigidity and strength at a wide range of temperatures.

In particular embodiments, the intermediary member 70 can comprise a substantially hollow member (e.g., a garter spring). In an embodiment, the first arm 36 can include a channel 38 wherein the intermediary member 70 can be positioned. Throughout thermal expansion and contraction of the seal assembly 16, the intermediary member 70 can rotate and slide within the channel 38 as necessary to maintain contact with the first arm 36. This may allow the seal assembly 16 to retrofit against expansion and contraction while maintaining sufficient structural rigidity.

In an embodiment, the seal assembly 16 can further include an annular member 72 positioned radially outside of the intermediary member 70. In particular embodiments the annular member 72 can be positioned radially outside of the annular body 32. In other embodiments, the annular member 72 can be positioned radially between the first and second arms 36 and 42 of the annular body 32 such that force is applied only against the first arm 36. In this regard, the annular member 72 can provide radial force to maintain a bubble tight seal between the sealing surface 58 and the control member 8. The annular member 72 can have a generally crescent cross-sectional shape or a partially crescent cross-sectional shape. In an embodiment, the inner surface of the annular member 72 can have an arcuate curve complementary to the outer diameter of the intermediary member 70 such that the annular member will not undesirably disengage from the intermediary member 70.

In particular embodiments, the annular member 72 and intermediary member 70 can be nested within a cavity 40 of the seal assembly 16 as formed between the first and second arms 36 and 42, and the hub 34. This may prevent undesirable disengagement of the members 70 and 72. To further ensure stability of the annular member 72 and the intermediary member 70 within the cavity 40, the annular member 72 can be symmetrically formed. In this regard, the annular member 72 can have an even construction between a first half 74 and a second half 76, such that the annular member 72 shrinks uniformly.

In traditional seals, as the temperature within the valve is reduced to a point of cryogenic operation, the sealing assembly—most specifically, the sealing surface—can lack sufficient radial compressive strength to maintain sufficient contact and fluidic seal with the control member. In this regard, the sealing assembly can have reduced sealing performance when handling cryogenic substances such as liquid nitrogen. The annular member 72 of the present seal assembly 16 can comprise a material adapted to shrink around the annular body 32 so as to maintain the sealing surface 58 in tight communication with the control member 8 at low operating temperatures.

In particular embodiments, the annular member 72 can comprise a material with a high coefficient of thermal expansion. For instance, the annular member 72 can comprise a material having a coefficient of thermal expansion of at least 40 m/m/° C., such as at least 50 m/m/° C., at least 60 m/m/° C., at least 70 m/m/° C., at least 80 m/m/° C., at least 90 m/m/° C., at least 100 m/m/° C., at least 120 m/m/° C., at least 140 m/m/° C., at least 160 m/m/° C., at least 180 m/m/° C., or even at least 200 m/m/° C. In particular embodiments, the annular member 72 can comprise a material having a coefficient of thermal expansion of no greater than 700 m/m/° C., such as no greater than 600 m/m/° C., no greater than 500 m/m/° C., no greater than 400 m/m/° C., no greater than 300 m/m/° C., or even no greater than 200 m/m/° C. In this regard, the annular member 72 can be highly responsive to thermal environmental adjustments. Thus, as the temperature of the ambient environment decreases the annular member 72 can exhibit thermal shrinkage, causing the annular member to urge against the intermediary member 70.

The annular member 72 can comprise a material having a modulus of elasticity of no less than 400 MPa, such as no less than 500 MPa, no less than 600 MPa, no less than 700 MPa, no less than 800 MPa, no less than 900 MPa, no less than 1,000 MPa, no less than 1,250 MPa, no less than 1,500 MPa, no less than 1,750 MPa, no less than 2,000 MPa, no less than 2,250 MPa, no less than 2,500 MPa, or even no less than 2,750 MPa. In certain embodiments, the modulus of elasticity of the annular member 72 can be no greater than 4,500 MPa, such as no greater than 4,250 MPa, no greater than 4,000 MPa, no greater than 3,750 MPa, no greater than 3,500 MPa, no greater than 3,250 MPa, no greater than 3,000 MPa, or even no greater than 2,750 MPa. In a particular embodiment, the annular member 72 can have a modulus of elasticity of between 700 MPa and 900 MPa. In yet a more particular embodiment, the annular member 72 can have a modulus of elasticity of between 800 and 850 MPa.

In an embodiment, the annular member 72 can comprise a polymeric material, such as, for example, a thermoplastic polymer. An example thermoplastic polymer includes Nylon, polyethylene (PE), ultra-high molecular weight polyethylene (UHMWPE), high-density polyethylene (HDPE), medium-density polyethylene (MDPE), polypropylene (PP), polyvinyl chloride (PVC), polyaryletherketone (PEAK), fluoropolymers, or any combination thereof.

An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof.

In a particular embodiment, the annular member 72 can be inert to liquid natural gas, liquid nitrogen, or petrochemical residuals such as hydrogen sulfide (H2S), carbon monoxide (CO), carbon dioxide (CO2), sulfur dioxide (SO2), and trade halides. In a particular embodiment the annular member 72 can comprise a polyethylene such as UHMWPE. UHMWPE offers several advantages such as its resistance to degradation, superior tensile strength at, or near, cryogenic temperatures, and a minimal elongation at break.

In an embodiment, the annular member 72 can have an initial inner diameter, $D_1$, prior to exposure to cryogenic temperatures, and a cooled inner diameter, $D_2$, after exposure to cryogenic temperatures. In certain embodiment, $D_1$ can be greater than 1.0001 $D_2$, such as greater than 1.0005 $D_2$, greater than 1.001 $D_2$, greater than 1.005 $D_2$, greater than 1.01 $D_2$, greater than 1.015 $D_2$, greater than 1.02 $D_2$, greater than 1.025 $D_2$, greater than 1.03 $D_2$, greater than 1.035 $D_2$, greater than 1.05 $D_2$, greater than 1.075 $D_2$, greater than 1.1 $D_2$, greater than 1.2 $D_2$, greater than 1.3 $D_2$, greater than 1.4 $D_2$, or even greater than 1.5 $D_2$. In another embodiment, $D_1$ can be less than 2 $D_2$, such as less than 1.5 $D_2$.

As the annular member 72 shrinks it can provide a compressive force against the intermediary member 70. This force, as measured at −160° C., can be no less than 1 $N/cm^2$, such as no less than 2 $N/cm^2$, no less than 3 $N/cm^2$, no less than 4 $N/cm^2$, no less than 5 $N/cm^2$, no less than 6 $N/cm^2$, no less than 7 $N/cm^2$, no less than 8 $N/cm^2$, no less than 9 $N/cm^2$, no less than 10 $N/cm^2$, no less than 15 N/cm2, no less than 20 $N/cm^2$, no less than 30 $N/cm^2$, no less than 40 $N/cm^2$, no less than 50 $N/cm^2$, no less than 60 $N/cm^2$, no less than 70 $N/cm^2$, no less than 80 $N/cm^2$, no less than 90 $N/cm^2$, or even no less than 100 $N/cm^2$. Moreover, the radial force at −160° C. can be no greater than 500 $N/cm^2$, such as no greater than 400 $N/cm^2$, no greater than 300 $N/cm^2$, no greater than 200 $N/cm^2$, no greater than 175 $N/cm^2$, no greater than 150 $N/cm^2$, no greater than 125 $N/cm^2$, or even no greater than 100 $N/cm^2$.

In an embodiment, the annular member 72 can provide a radial force, as measured at room temperature (e.g., 22° C.), of no greater than 100 $N/cm^2$, such as no greater than 50 $N/cm^2$, no greater than 25 $N/cm^2$, no greater than 10 $N/cm^2$, no greater than 5 $N/cm^2$, no greater than 1 $N/cm^2$, no greater than 0.1 N/cm², or even no greater than 0.01 N/cm². Moreover, the radial force at room temperature can be at least 0 N/cm².

Generally, to test the sealing characteristic (the leakage rate) of a valve, the valve is subjected to a fluidic pressure for a specified period of time at a particular temperature or operational condition. To test butterfly valves, the present description utilizes a Butterfly Valve (BFV) test. The BFV test generally includes the following procedures. A butterfly valve housing having an inlet port and an outlet port is fitted with a seal assembly and a control member operatively positioned within the valve housing. Both the inlet port and the outlet port are covered and sealed so as to eliminate external leakage of fluid. An ingress line is run into the inlet port through the inlet cover and seal assembly and an egress line is run through the outlet port through the outlet cover and seal assembly. An inverted collector (e.g., a graduated cylinder) is connected to the egress line and filled with pure water ($H_2O$). The control member is rotated to the closed orientation and the assembly is brought to the desired testing temperature. For testing at cryogenic temperatures the entire assembly is submerged in a tank filled with liquid nitrogen and allowed to cool to between −161° C. and −164° C. After cooling is complete, gas is introduced into the inlet port. Preferably, helium gas ($He_2$) of at least 97% purity is used for testing. The gas is introduced into the inlet port at a desired pressure to be tested and hydrostatic pressure is maintained for a desired period of time. The valve can be opened and closed to determine performance during extended uses. One cycle relates to opening and closing the control member.

After the conclusion of testing, the pressure of the gas is brought back to ambient conditions and the volume of gas within the inverted collector is measured. Alternatively, continuous flow measurement of the gas can be calculated at a desired rate (e.g., mL per minute).

A valve in accordance with embodiments of the present description can have a reverse leakage rate, as measured by the BFV test at a hydrostatic pressure of 1.5 MPa and at −160° C., of less than 300 mL/min, such as less than 240 mL/min, less than 230 mL/min, less than 220 mL/min less than 210 mL/min, less than 200 mL/min, less than 190 mL/min, less than 180 mL/min, less than 170 mL/min, less than 160 mL/min, less than 150 mL/min, less than 130 mL/min, less than 110 mL/min, less than 90 mL/min, less than 70 mL/min, less than 50 mL/min, less than 30 mL/min, less than 10 mL/min, or even less than 5 mL/min. In particular embodiments, the valve can have a reverse leakage rate as measured by the BFV test at a hydrostatic pressure of 1.5 MPa and at −160° C., of 0 mL/min. In particular embodiments, the valve 1 can have a reverse leakage rate of 0 mL/min, as measured by the BFV test at a hydrostatic pressure of 2.74 MPa and at room temperature.

In particular embodiments, the valve can have a forward leakage rate of 0 mL/min, as measured by the BFV test at a hydrostatic pressure of 5.47 MPa and at room temperature. Moreover, the valve can have a forward leakage rate, as measured by the BFV test at a hydrostatic pressure of 1.0 MPa and at −160° C., of less than 140 mL/min, such as less than 130 mL/min, less than 120 mL/min, less than 110 mL/min, less than 100 mL/min, less than 90 mL/min, less than 80 mL/min, less than 70 mL/min, less than 60 mL/min, less than 50 mL/min, less than 25 mL/min, less than 10 mL/min, or even less than 5 mL/min. In particular embodiments, the valve, as measured by the BFV test at a hydrostatic pressure of 1.0 MPa and at −160° C., can have a forward leakage rate of 0 mL/min.

In conjunction with leakage rate, a valve in accordance with an embodiment described herein can maintain the above described leakage rates for at least 650 cycles, such as at least 700 cycles, at least 750 cycles, at least 800 cycles, at least 850 cycles, at least 900 cycles, at least 950 cycles, at least 1000 cycles, at least 1050 cycles, at least 1100 cycles, at least 1200 cycles, at least 1250 cycles, at least 1300 cycles, at least 1350 cycles, at least 1400 cycles, at least 1500 cycles, at least 1550 cycles, at least 1600 cycles, at least 1650 cycles, at least 1700 cycles, at least 1750 cycles, at least 1800 cycles, or even at least 1850 cycles.

Items.

Item 1. A bi-directional valve seal assembly comprising an annular body having a sealing surface defining an aperture; and an annular member radially disposed around at least a portion of the body, the annular member comprising a material having a coefficient of thermal expansion of at least 30 m/m/° C.

Item 2. A bi-directional valve comprising a housing having an inner surface defining a fluid passageway; a disc member rotatably disposed within the fluid passageway, the disc member adapted to impede fluid flow through the fluid passageway; and a seal assembly positioned along the inner surface of the housing, the seal assembly comprising an annular body having a sealing surface defining an aperture; and an annular member radially disposed around at least a portion of the body, the annular member comprising a material having a coefficient of thermal expansion of at least 30 m/m/° C.

Item 3. A bi-directional valve comprising a housing having an inner surface defining a fluid passageway; a disc member rotatably disposed within the fluid passageway, the disc member adapted to impede fluid flow through the fluid passageway when positioned in a first orientation, and adapted to permit fluid flow through the fluid passageway when positioned in a second orientation, the second orientation being rotationally transposed from the first orientation by between 1 degrees and 90 degrees; and a seal assembly positioned along the inner surface of the housing adapted to form a fluid tight seal between the inner surface of the housing and a radially outer surface of the disc member, the seal assembly comprising an annular body having a sealing surface defining an aperture, the sealing surface having a plurality of lobes projecting therefrom, each of the plurality of lobes extending radially around the sealing surface; an annular member radially disposed around at least a portion of the annular body, the annular member comprising a material having a coefficient of thermal expansion of at least 30 m/m/° C.; and an annular intermediary member positioned between the annular body and the annular member.

Item 4. The valve or valve seal assembly according to any one of the preceding items, wherein the annular body further comprises a hub; a first arm extending from the hub; and a second arm extending from the hub, wherein the hub, the first arm, and the second arm are coaxial, and wherein the sealing surface is disposed on a combination of the hub and an inner surface of the first arm.

Item 5. The valve or valve seal assembly according to item 4, wherein the hub, the first arm, and the second arm form a generally U-shaped structure.

Item 6. The valve or valve seal assembly according to any one of items 4 or 5, wherein the first arm and the second arm are substantially parallel.

Item 7. The valve or valve seal assembly according to any one of items 4-6, wherein the second arm is radially outside of the first arm.

Item 8. The valve or valve seal assembly according to any one of items 4-7, wherein the hub further comprises a radially outer surface, the radial outer surface having a recess wherein a first sealing element is positioned.

Item 9. The valve or valve seal assembly according to item 8, wherein the first sealing element comprises a spring.

Item 10. The valve or seal assembly according to any one of items 4-9, wherein the second arm further comprises a flange, the flange having a distal cavity comprising a second sealing element positioned therein.

Item 11. The valve or seal assembly according to item 10, wherein the second sealing element comprises a spring.

Item 12. The valve or valve seal assembly according to any one of items 1, 2, or 4-12, wherein the sealing surface comprises a plurality of lobes.

Item 13. The valve or valve seal assembly according to any one of items 4-12, wherein a first of the plurality of lobes is positioned on the hub and a second of the plurality of lobes is positioned on the first arm.

Item 14. The valve or valve seal assembly according to any one of items 3, 12, or 13, wherein each one of the plurality of lobes extends radially inward from the sealing surface a discrete distance.

Item 15. The valve or valve seal assembly according to any one of items 3, or 12-14, wherein each one of the plurality of lobes comprises a rounded profile defining an apex.

Item 16. The valve or valve seal assembly according to any one of items 3, or 12-15, wherein each one of the plurality of lobes is a monolithic extension from the sealing surface.

Item 17. The valve or valve seal assembly according to any one of items 3, or 12-16, wherein each one of the plurality of lobes includes a polymeric layer.

Item 18. The valve or valve seal assembly according to any one of items 3, or 12-17, wherein each one of the plurality of lobes includes a layer comprising a fluoroplastic or a fluoropolymer, such as PTFE, TFM, FEP, CTFE, or ETFE.

Item 19. The valve or valve seal assembly according to any one of items 1 or 2, further comprising an annular intermediary member radially positioned between at least a portion of the annular body and the annular member.

Item 20. The valve or valve seal assembly according to any one of items 3-19, wherein the annular intermediary member has a modulus of elasticity of no less than 1 GPa, no less than 10 GPa, no less than 50 GPa, no less than 100 GPa, no less than 150 GPa, no less than 200 GPa, no less than 225 GPa.

Item 21. The valve or valve seal assembly according to any one of items 3-20, wherein the annular intermediary member has a modulus of elasticity of no greater than 700 GPa, no greater than 600 GPa, no greater than 500 GPa, no greater than 400 GPa, no greater than 300 GPa.

Item 22. The valve or valve seal assembly according to any one of items 3-21, wherein the annular intermediary member provides the annular body with a radial inward force of no less than 0.5 N/cm2, no less than 1.0 N/cm2, no less than 2.0 N/cm2, no less than 3.0 N/cm2, no less than 4.0 N/cm2.

Item 23. The valve or valve seal assembly according to any one of items 3-22, wherein the annular intermediary member provides the annular body with a radial inward force of no greater than 20 N/cm2, no greater than 15 N/cm2, no greater than 10 N/cm2, no greater than 5 N/cm2.

Item 24. The valve or valve seal assembly according to any one of items 3-23, wherein the annular intermediary member is substantially hollow.

Item 25. The valve or valve seal assembly according to any one of items 3-24, wherein the annular intermediary member comprises a spring.

Item 26. The valve or valve seal assembly according to any one of items 3-25, wherein the annular intermediary member comprises a garter spring.

Item 27. The valve or valve seal assembly according to any one of items 3-26, wherein the annular intermediary member comprises a metal.

Item 28. The valve or valve seal assembly according to any one of items 3-27, wherein the annular intermediary member comprises a steel.

Item 29. The valve or valve assembly according to any one of items 3-28, wherein the annular intermediary member comprises a steel alloy.

Item 30. The valve or valve seal assembly according to any one of items 8-20, wherein the radially outer surface of the first arm comprises a channel, and wherein an inner surface of the annular intermediary member is positioned at least partially within the channel.

Item 31. The valve or valve seal assembly according to item 30, wherein the annular intermediary member is adapted to rotate and slide within the channel.

Item 32. The valve or valve seal assembly according to any one of the preceding items, wherein the annular member comprises a material having a coefficient of thermal expansion of at least 40 m/m/° C., at least 50 m/m/° C., at least 60 m/m/° C., at least 70 m/m/° C., at least 80 m/m/° C., at least 90 m/m/° C., at least 100 m/m/° C., at least 120 m/m/° C., at least 140 m/m/° C., at least 160 m/m/° C., at least 180 m/m/° C., at least 200 m/m/° C.

Item 33. The valve or valve seal assembly according to any one of the preceding items, wherein the annular member comprises a material having a coefficient of thermal expansion of no greater than 700 m/m/° C., no greater than 600 m/m/° C., no greater than 500 m/m/° C., no greater than 400 m/m/° C., no greater than 300 m/m/° C., no greater than 200 m/m/° C.

Item 34. The valve or valve seal assembly according to any one of the preceding items, wherein the annular member comprises a material having a modulus of elasticity of no less than 400 MPa, no less than 500 MPa, no less than 600 MPa, no less than 700 MPa, no less than 800 MPa, no less than 900 MPa, no less than 1,000 MPa, no less than 1,250 MPa, no less than 1,500 MPa, no less than 1,750 MPa, no less than 2,000 MPa, no less than 2,250 MPa, no less than 2,500 MPa, no less than 2,750 MPa.

Item 35. The valve or valve seal assembly according to any one of the preceding items, wherein the annular member comprises a material having a modulus of elasticity of no greater than 4,500 MPa, no greater than 4,250 MPa, no greater than 4,000 MPa, no greater than 3,750 MPa, no greater than 3,500 MPa, no greater than 3,250 MPa, no greater than 3,000 MPa, no greater than 2,750 MPa.

Item 36. The valve or valve seal assembly according to any one of the preceding items, wherein the annular member comprises an inert material.

Item 37. The valve or valve seal assembly according to any one of the preceding items, wherein the annular member comprises a polymer.

Item 38. The valve or valve seal assembly according to any one of the preceding items, wherein the annular member comprises a fluoropolymer, such as PTFE or PVDF.

Item 39. The valve or valve seal assembly according to any one of the preceding items, wherein the annular member comprises a polyaryletherketone, such as PEK, PEEK, PEKK, PEEKK, or PEKEKK.

Item 40. The valve or valve seal assembly according to any one of the preceding items, wherein the annular member comprises polyethylene.

Item 41. The valve or valve seal assembly according to any one of the preceding items, wherein the annular member comprises ultra-high-molecular-weight-polyethylene.

Item 42. The valve or valve seal assembly according to any one of the preceding items, wherein the annular member has an internal diameter, D1, as measured at room temperature, wherein the annular member has an internal diameter, D2, as measured at −160° C., and wherein D2 is less than D1.

Item 43. The valve or valve seal assembly according to item 42, wherein D1 is greater than 1.0001 D2, greater than 1.0005 D2, greater than 1.001 D2, greater than 1.005 D2, greater than 1.01 D2, greater than 1.015 D2, greater than 1.02 D2, greater than 1.025 D2, greater than 1.03 D2, greater than 1.035 D2, greater than 1.05 D2, greater than 1.075 D2, greater than 1.1 D2, greater than 1.2 D2, greater than 1.3 D2, greater than 1.4 D2, greater than 1.5 D2.

Item 44. The valve or valve seal assembly according to any one of items 42 or 43, wherein D1 is less than 2 D2, less than 1.5 D2.

Item 45. The valve or valve seal assembly according to any one of the preceding items, wherein the annular member, when measured at −160° C., provides the intermediary member with a radial inward force of no less than 1 N/cm$^2$, no less than 2 N/cm$^2$, no less than 3 N/cm$^2$, no less than 4 N/cm$^2$, no less than 5 N/cm$^2$, no less than 6 N/cm$^2$, no less than 7 N/cm$^2$, no less than 8 N/cm$^2$, no less than 9 N/cm$^2$, no less than 10 N/cm$^2$, no less than 15 N/cm$^2$, no less than 20 N/cm$^2$, no less than 30 N/cm$^2$, no less than 40 N/cm$^2$, no less than 50 N/cm$^2$, no less than 60 N/cm$^2$, no less than 70N/cm$^2$, no less than 80 N/cm$^2$, no less than 90 N/cm$^2$, no less than 100 N/cm$^2$.

Item 46. The valve or valve seal assembly according to any one of the preceding items, wherein the annular member, when measured at −160° C., provides the intermediary member with a radial inward force of no greater than 500 N/cm$^2$, no greater than 400 N/cm$^2$, no greater than 300 N/cm$^2$, no greater than 200 N/cm$^2$, no greater than 175 N/cm$^2$, no greater than 150 N/cm$^2$, no greater than 125 N/cm$^2$, no greater than 100 N/cm$^2$.

Item 47. The valve or valve seal assembly according to any one of the preceding items, wherein the annular member, when measured at room temperature, provides the intermediary member with a radial inward force of no greater than 100 N/cm$^2$, no greater than 50 N/cm$^2$, no greater than 25 N/cm$^2$, no greater than 10 N/cm$^2$, no greater than 5 N/cm$^2$, no greater than 1 N/cm$^2$, no greater than 0.1 N/cm$^2$, no greater than 0.01 N/cm$^2$.

Item 48. The valve or valve seal assembly according to any one of the preceding items, wherein the annular member, when measured at room temperature, provides the intermediary member with a radial inward force of 0 N/cm2.

Item 49. The valve or valve seal assembly according to any one of items 3-48, wherein the annular member is positioned radially outside of the annular body.

Item 50. The valve or valve seal assembly according to any one of items 4-48, wherein the first and second arms define a radial gap, and wherein the annular member is positioned within the radial gap.

Item 51. A bi-directional cryogenic rotary valve, wherein the valve has a reverse leakage rate, as measured by the Butterfly Valve (BFV) test at a hydrostatic pressure of 1.5 MPa and at −160° C., of less than 300 mL/min, less than 240 mL/min.

Item 52. The valve according to any one of items 2-51, wherein the valve has a reverse leakage rate, as measured by the BFV test at a hydrostatic pressure of 1.5 MPa and at −160° C., of less than 230 mL/min, less than 220 mL/min less than 210 mL/min, less than 200 mL/min, less than 190 mL/min, less than 180 mL/min, less than 170 mL/min, less than 160 mL/min, less than 150 mL/min, less than 130 mL/min, less than 110 mL/min, less than 90 mL/min, less than 70 mL/min, less than 50 mL/min, less than 30 mL/min, less than 10 mL/min, less than 5 mL/min.

Item 53. The valve according to any one of items 2-52, wherein the valve has a reverse leakage rate of 0 mL/min, as measured by the BFV test at a hydrostatic pressure of 1.0 MPa and at −160° C.

Item 54. The valve according to any one of items 2-53, wherein the valve has a reverse leakage rate of 0 mL/min, as measured by the BFV test at a hydrostatic pressure of 2.74 MPa and at room temperature.

Item 55. The valve according to any one of items 2-54, wherein the valve has a forward leakage rate of 0 mL/min, as measured by the BFV test at a hydrostatic pressure of 5.47 MPa and at room temperature; and wherein the valve has a forward leakage rate of less than 140 mL/min, as measured by the BFV test at a hydrostatic pressure of 1.0 MPa and at −160° C.

Item 56. The valve according to any one of items 2-55, wherein the valve, as measured by the BFV test at a hydrostatic pressure of 1.0 MPa and at −160° C., has a forward leakage rate of less than 130 mL/min, less than 120 mL/min, less than 110 mL/min, less than 100 mL/min, less than 90 mL/min, less than 80 mL/min, less than 70 mL/min, less than 60 mL/min, less than 50 mL/min, less than 25 mL/min, less than 10 mL/min, less than 5 mL/min.

Item 57. The valve according to any one of items 2-56, wherein the valve, as measured by the BFV test at a hydrostatic pressure of 1.0 MPa and at −160° C., has a forward leakage rate of 0 mL/min.

Item 58. The valve according to any one of items 2-57, wherein the seal assembly is adapted to maintain a bubble tight seal for at least 650 cycles, at least 700 cycles, at least 750 cycles, at least 800 cycles, at least 850 cycles, at least 900 cycles, at least 950 cycles, at least 1000 cycles, at least 1050 cycles, at least 1100 cycles, at least 1200 cycles, at least 1250 cycles, at least 1300 cycles, at least 1350 cycles, at least 1400 cycles, at least 1500 cycles, at least 1550 cycles, at least 1600 cycles, at least 1650 cycles, at least 1700 cycles, at least 1750 cycles, at least 1800 cycles, at least 1850 cycles.

EXAMPLE

Butterfly valves are tested using the BFV test as described above. The valves are assembled (i.e., the inlet and outlet ports are covered and sealed and the gas in and out lines are attached thereto) and inserted into a container of liquid nitrogen. After reaching −161° C. the control member of each of the valves is then cycled between the open and closed orientation (i.e., the control member is rotated a quarter turn to the open position and a quarter turn to the closed position) and measurements of leakage are again taken. Each cycle includes a quarter turn in the open direction and a quarter turn in the closed direction. The number of cycles until seal fatigue is observed and measured (i.e., the number of cycles until the seal fails to produce a sufficient sealing characteristic as desired such as, for example, 0 mL/min).

Sample 1 is a rotatable butterfly valve having a seal assembly formed from aluminum. The seal assembly has an initial inner diameter of 8.914 inches, an initial ring thickness of 0.05 inches, and an initial width of 0.2 inches. The aluminum has a modulus of elasticity of 85,495 MPa and a yield strength of 248.21 MPa. After cooling to −161° C. Sample 1 has an inner diameter of 8.889 inches.

Sample 2 is a rotatable butterfly valve having a seal assembly in accordance with FIG. 3 and formed from PTFE. The seal assembly has an initial inner diameter of 8.914 inches, an initial ring thickness of 0.110 inches, and an initial width of 0.2 inches. The PTFE has a modulus of elasticity of 2,964 MPa and a yield strength of 92.42 MPa. After cooling to −161° C. Sample 2 has an inner diameter of 8.760 inches.

Sample 3 is a rotatable butterfly valve having a seal assembly in accordance with FIG. 3 and formed from UHMWPE. The seal assembly has an initial diameter of 8.914 inches, an initial ring thickness of 0.110 inches, and an initial width of 0.200 inches. The UHMWPE has a modulus of elasticity of 2,937 MPa and a yield strength of 88.94 MPa. After cooling to −161° C. Sample 3 has an inner diameter of 8.7510 inches.

TABLE 1

Test Data

| Sample | Δ Diameter (inches) initial diameter—reduced diameter | Fatigue (cycles) |
|---|---|---|
| Sample 1 | 0.025 | 647 |
| Sample 2 | 0.154 | 1673 |
| Sample 3 | 0.163 | 1853 |

As shown in Table 1, Sample 3 exhibits the largest change in inner diameter when cooled from room temperature to −161° C., an 650% increase in diametrical change over that of Sample 1. Correspondingly, Sample 3 operates with effective sealing characteristics for 1853 cycles, an 285% increase in operational life over Sample 1. Sample 2 exhibits an 615% increase in diametrical change over Sample 1. Sample 2 operates with effective sealing characteristics for 1673 cycles, an 260% increase in operational life over Sample 1. The change in diameter can affect a greater sealing pressure and also allow for a longer period of use prior to seal failure.

What is claimed is:

1. A bi-directional cryogenic rotary valve seal assembly comprising:
   an annular body having a sealing surface defining an aperture, and a hub, wherein the hub further comprises a radially outer surface, the radial outer surface having a recess groove extending radially inward from the radial outer surface, wherein a first sealing element is positioned within the recess groove, wherein the sealing surface having a plurality of lobes projecting therefrom, each of the plurality of lobes extending radially around the sealing surface, wherein at least one of the plurality of lobes has a U-shaped cross-sectional profile; and
   an annular member radially disposed around at least a portion of the body, the annular member comprising a material having a coefficient of thermal expansion of at least 30 m/m/° C., wherein the annular member has a generally crescent cross-sectional shape along a shared central axis with the annular member.

2. The valve seal assembly according to claim 1, wherein the annular body further comprises:
   a first arm extending from the hub; and
   a second arm extending from the hub,
   wherein the hub, the first arm, and the second arm are coaxial, and wherein the sealing surface is disposed on a combination of the hub and an inner surface of the first arm.

3. The seal assembly according to claim 2, wherein the second arm further comprises a flange, the flange having a distal cavity comprising a second sealing element positioned therein.

4. The valve seal assembly according to claim 1, wherein a first of the plurality of lobes is positioned on the hub and a second of the plurality of lobes is positioned on the first arm.

5. The valve seal assembly according to claim 1, further comprising an annular intermediary member radially positioned between at least a portion of the annular body and the annular member.

6. The valve seal assembly according to claim 5, wherein the annular intermediary member comprises a garter spring.

7. The valve seal assembly according to claim 5, wherein the radially outer surface of the first arm comprises a channel, and wherein an inner surface of the annular intermediary member is positioned at least partially within the channel.

8. The valve seal assembly according to claim 7, wherein the annular intermediary member is adapted to rotate and slide within the channel.

9. A bi-directional valve comprising:
   a housing having an inner surface defining a fluid passageway;
   a disc member rotatably disposed within the fluid passageway, the disc member adapted to impede fluid flow through the fluid passageway; and
   a seal assembly positioned along the inner surface of the housing, the seal assembly comprising:
      an annular body having a sealing surface defining an aperture, and a hub, wherein the hub further comprises a radially outer surface, the radial outer surface having a recess groove extending radially inward from the radial outer surface, wherein a first sealing element is positioned within the recess groove, wherein the sealing surface having a plurality of lobes projecting therefrom, each of the plurality of lobes extending radially around the sealing surface, wherein at least one of the plurality of lobes has a U-shaped cross-sectional profile; and
      an annular member radially disposed around at least a portion of the body, the annular member comprising a material having a coefficient of thermal expansion of at least 30 m/m/° C., wherein the annular member has a generally crescent cross-sectional shape along a shared central axis with the annular member and an innermost surface forming an arcuate curve.

10. The valve according to claim 9, wherein the annular body further comprises:
    a first arm extending from the hub; and
    a second arm extending from the hub,
    wherein the hub, the first arm, and the second arm are coaxial, and wherein the sealing surface is disposed on a combination of the hub and an inner surface of the first arm.

11. The valve according to claim 9, further comprising an annular intermediary member radially positioned between at least a portion of the annular body and the annular member.

12. The valve according to claim 11, wherein the radially outer surface of the first arm comprises a channel, and wherein the annular intermediary member is adapted to rotate and slide within the channel.

13. The valve according to claim 9, wherein a first of the plurality of lobes is positioned on the hub and a second of the plurality of lobes is positioned on the first arm.

14. A bi-directional valve comprising:
a housing having an inner surface defining a fluid passageway;
a disc member rotatably disposed within the fluid passageway, the disc member adapted to impede fluid flow through the fluid passageway when positioned in a first orientation, and adapted to permit fluid flow through the fluid passageway when positioned in a second orientation, the second orientation being rotationally transposed from the first orientation by between 1 degrees and 90 degrees; and
a seal assembly positioned along the inner surface of the housing adapted to form a fluid tight seal between the inner surface of the housing and a radially outer surface of the disc member, the seal assembly comprising:
an annular body having a sealing surface defining an aperture, and a hub, wherein the hub further comprises a radially outer surface, the radial outer surface having a recess groove extending radially inward from the radial outer surface, wherein a first sealing element is positioned within the recess groove, the sealing surface having a plurality of lobes projecting therefrom, each of the plurality of lobes extending radially around the sealing surface, wherein at least one of the plurality of lobes has a U-shaped cross-sectional profile;
an annular member radially disposed around at least a portion of the annular body, the annular member comprising a material having a coefficient of thermal expansion of at least 30 m/m/° C.; and
an annular intermediary member positioned between the annular body and the annular member, wherein the annular member has a generally crescent cross-sectional shape along a shared central axis with the annular member.

15. The valve according to claim 14, wherein the annular member, when measured at −160° C., provides the intermediary member with a radial inward force of no less than 10 N/cm$^2$.

16. The valve according to claim 14, wherein the annular member, when measured at about room temperature, provides the intermediary member with a radial inward force of no greater than 25 N/cm$^2$.

17. The valve according to claim 14, wherein the annular intermediary member comprises a garter spring.

* * * * *